United States Patent Office 2,948,020
Patented Aug. 9, 1960

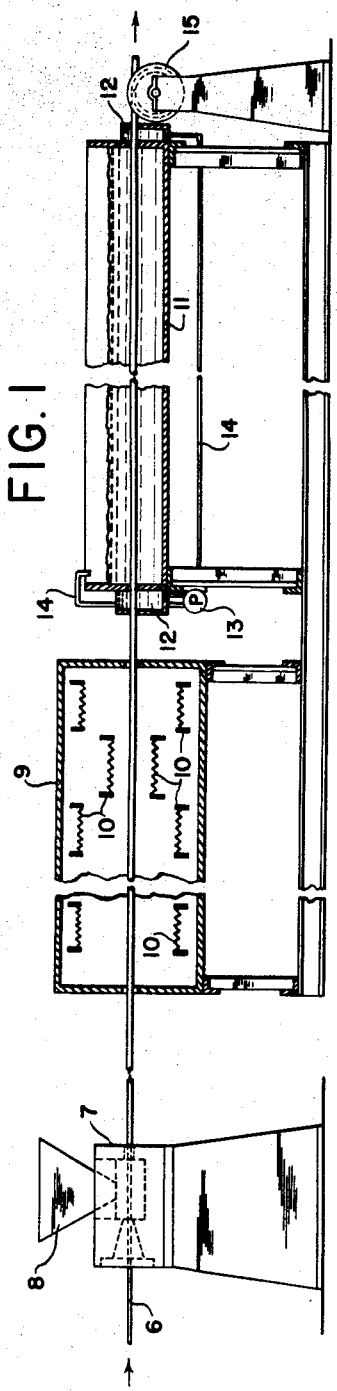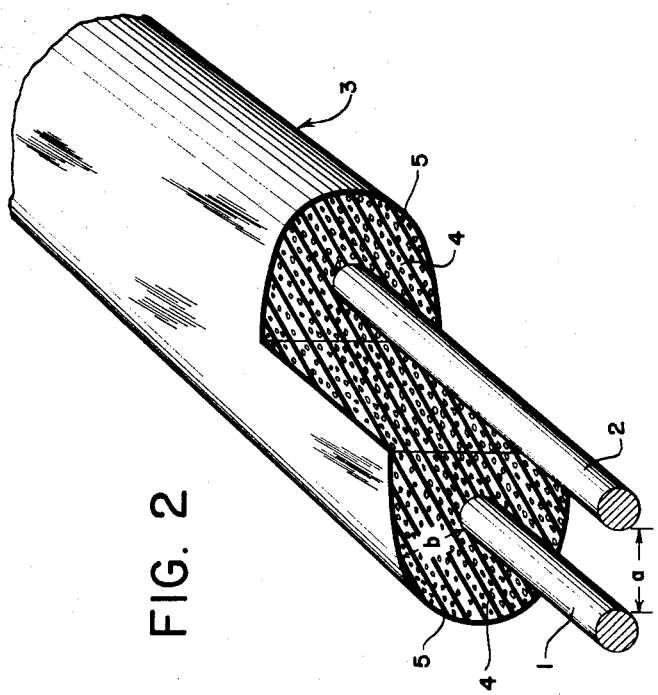
INVENTOR
Ralph G. D'Ascoli
BY
ATTORNEYS

2,948,020

METHOD OF MAKING HIGH FREQUENCY CABLE

Ralph G. D'Ascoli, Yonkers, N.Y., assignor to Anaconda Wire and Cable Company, a corporation of Delaware Filed Nov. 6, 1953, Ser. No. 390,583

3 Claims. (Cl. 18—59)

This invention relates to a method of manufacturing cables for use at high frequencies, especially very high and ultra high frequencies in the range extending from 30 to 3,000 megacycles. More particularly the invention is directed to an improved method of manufacturing a cable comprising a wire insulated with a layer of cellular polyethylene.

The new cable comprises at least one metallic conductor embedded directly in and supported throughout the length of the cable by a flexible body of insulation comprising darkly pigmented polyethylene. Such insulation, in accordance with the invention, is of cellular structure throughout its mass, the individual cells being substantially all separated from each other by impervious walls of polyethylene. At the outer surface of the insulation is a relatively thick smooth glossy non-porous skin of fused pigmented polyethylene which is integral with the underlying cellular mass.

In consequence of its cellular structure, the insulation of the new cable comprises a large proportion by volume of gas-filled spaces, sufficient so that the bulk density of the insulation is at least 40% less than that of solid polyethylene. As a result, its high frequency dielectric properties are very much superior to those of the best grade of solid polyethylene. The glossy surface skin of fused pigmented polyethylene insures against penetration of moisture either in the solid or vapor state into the body of the insulation, and even if there be local cracks or perforations extending through such skin, the cellular character of the underlying mass of insulation is nonetheless still impenetrable by moisture. The smooth glossy surface of the skin also minimizes the accumulation of deposits of foreign matter which may impair the electrical properties of the cable, and facilitates the washing off of such deposits as may collect thereon. Accordingly, the excellent high frequency properties of the new cable are preserved even in damp or wet locations, and over prolonged periods of time in out-of-doors service.

For much high frequency use, as for VHF or UHF television lead-in service, the new cable comprises a pair of metallic conductors embedded and supported side by side in parallel spaced relation within the cellular mass of polyethylene insulation. A feature of such cables in accordance with the invention is that the cross-sectional dimensions of the insulation are such that the minimum distance radially outwardly from either conductor to the outer surface of the insulation is at least about equal to the spacing between conductors. Thereby the capacitive coupling of either conductor to ground when the outer surface skin of the cable is wet and grounded is at least about as small as the capacitive coupling between conductors. The invention, however, is not limited to cables of the two-conductor parallel type just described. It is equally applicable, for example, to coaxial cables having one conductor centered in a cylindrical insulation body of the glossy-surfaced cellular polyethylene, and a metallic braid or equivalent conductor surrounding such insulation.

A further feature of cables in accordance with the invention lies in the incorporation in the polyethylene of a well-dispersed dark-colored pigment. The resistance to weathering of the polyethylene covering is to a considerable extent dependent on the amout of solar radiation (especially ultra-violet) which may be excluded from the polyethylene. The weathering properties of polyethylene are greatly improved when the ultra-violet transmission therethrough is reduced and when other photochemical effects of sunlight are minimized by the addition of a dark pigment. The outer surface skin of dense fused pigmented polyethylene, which is of substantially the maximum density of the pigmented polyethylene and which is of a thickness substantially greater than the thickness of the walls separating the cells of the main body of the insulation, effectively screens the main body of the cellular insulation from ultra-violet radiation, and the ability of the insulation to withstand damage by exposure to the weather is thereby greatly enhanced.

The method of forming a high frequency cable of this invention comprises extruding a mixture of polyethylene, a dark-colored pigment, and a blowing agent as an insulating layer about a wire, and heating such layer to above the decomposition temperature of the blowing agent, whereby a porous cellular structure is imparted thereto. Thereafter the cellular insulation layer on the wire is exposed to a source of radiant heat maintained at a temperature substantially above the melting temperature of the polyethylene, and is held thus exposed until the outer surface portion of the insulation layer has become at least partially fused, whereby a dense, non-porous glossy smooth protective outer skin is formed on the cellular layer of insulation.

An advantageous embodiment of a cable and the method of manufacturing it according to this invention is illustrated in the accompanying drawings, in which Fig. 1 is a side view partly in section schematically illustrating apparatus for manufacturing the cable of this invention; and Fig. 2 is a perspective view partly in section showing the finished cable.

As shown in Fig. 2, the cable comprises two metallic conductors 1 and 2 of copper or other good conducting metal, arranged in spaced parallel relation and embedded in a mass of pigmented polyethylene insulation 3. The insulation 3 extends throughout the entire length of the cable and serves to support and maintain the conductors 1 and 2 in proper spaced relation.

The insulation 3 is, in accordance with the invention, of the cellular structure indicated at 4 throughout its entire mass, except for the provision of a smooth glossy non-porous surface skin 5 which is integral with the underlying cellular mass. It is important that the mass of insulation 3 be of cellular as distiguished from spongy structure. The cellular structure 4 is such that the individual cells or pores are substantially all separated from one another by impervious walls of the pigmented polyethylene. A spongy structure, on the other hand, is one in which the pores are in more or less free communication with one another. The cellular structure employed in accordance with the invention is incapable of absorbing moisture unless it is severely damaged; whereas a spongy structure (which in accordance with the invention must be avoided) absorbs moisture freely. We have found that the cellular polyethylene insulation as above described suffers little impairment of its excellent high frequency dielectric properties when exposed to moisture. A similar-appearing polyethylene of spongy structure, which may have excellent dielectric properties when dry, is on the other hand completely unsatisfactory for high frequency insulation uses in moist atmospheres.

The aggregate volume of the cells of the insulation 3 should be sufficient to reduce the bulk density of the insulation to a value at least 40% less than that of solid polyethylene in order to obtain a substantial improvement in its high frequency dielectric properties. In some instances, cables having a somewhat lesser reduction in bulk density of the insulation may be used with advantage; and, of course, a much higher reduction in bulk density is desirable, up to the limit of a bulk density of about 75% less than that of solid polyethylene. This minimum bulk density value is set primarily by mechanical considerations; at lower bulk densities the cellular polyethylene becomes mechanically so weak that it does not provide effective support for the conductors when the cable is roughly handled.

In order to insure an adequately long life for the cable and to minimize the amount of moisture or other foreign deposit that can accumulate on its surface when used out-of-doors, the glossy skin 5 is provided. By the provision of this skin, the exposed surface area of the body of insulation is kept at a minimum, and it is kept substantially free of pores which might serve to accumulate and retain substantial deposits of foreign matter which could impair the electrical properties of the cable. The skin 5, of course, serves to exclude moisture from the underlying cellular body of the insulation; but even if the skin is punctured at any point, the cellular nature of the underlying structure suffices to prevent penetration of moisture therethrough. The glossy surface of the skin facilitates removal of such foreign matter as does collect thereon, as by wiping, or even by being washed by rains when the cable is used out-of-doors. The skin 5, which is integral with the underlying cellular mass of pigmented polyethylene, consists of a layer of the polyethylene which has been at least partially fused and which has substantially the maximum density of the pigmented polyethylene; and it is of a thickness substantially greater than the thickness of the walls which separate the cells of the main body of the insulation. Thus the skin is highly effective for screening the main cellular body of the insulation from exposure to visible and ultra-violet light, and the ability of the insulation to withstand damage by exposure to weather is thereby greatly increased.

In the case of two-conductor cables of the character shown in the drawing, in which the two conductors are arranged parallel to each other and are separated by a distance $a$, it is advantageous to proportion the cross-sectional dimensions of the insulation 3 so that the minimum radial distance $b$ from either conductor to the surface of the insulation is substantially equal to the distance $a$. Thereby, when the cable is used out-doors and its surface acquires a grounded conductive deposit of moisture or other foreign substance, the capacitive coupling of each conductor to ground is kept substantially as small as the capacitive coupling between conductors, and undesirable attenuation of high frequency signals carried by the cable is avoided.

An advantageous feature of the new cable is that the conductors 1 and 2 can be bared for the purpose of making connections simply by cutting away the insulation 3, without taking any special precautions to prevent the entrance of moisture through the cut end into the interior of the insulation. The cellular structure of the insulation suffices to insure that moisture will not penetrate through an exposed end of the insulation any more than it will penetrate through the skin 5 itself.

Referring now to Fig. 1 of the drawings, a method of forming high frequency cables according to the invention is illustrated. A metallic wire 6 (or, for purposes of making a cable of the character shown in Fig. 2, a pair of such wires arranged in spaced parallel relation) is passed substantially continuously through a conventional extrusion apparatus 7. A mixture of polyethylene, a blowing agent, and a dark-colored pigment is fed continuously into the extrusion apparatus through a hopper 8, and in such apparatus this mixture is heated and extruded in the form of a substantially continuous layer surrounding the wire (or wires) 6. Advantageously the polyethylene mixture is heated in the extrusion apparatus to a temperature above the decomposition temperature of the blowing agent, and is extruded at a temperature high enough so that it becomes expanded into a cellular structure during the first several feet of travel of the wire after emerging from the extrusion die (as described in copending application Serial No. 431,914, filed May 24, 1954). Alternatively, the wire with the freshly extruded layer of polyethylene mixture may be introduced, while still in the substantially unexpanded condition, into a heated bath of vegetable oil to effect decomposition of the blowing agent and expansion of the polyethylene layer into cellular form (as described in my copending application Serial No. 323,252, filed November 29, 1952). The particular manner in which the layer of polyethylene is expanded into cellular form, however, is not in itself critical. It suffices, for purposes of this invention, that a wire having thereon a layer of darkly pigmented polyethylene in expanded cellular form is made available by any desired manufacturing process.

The wire with the cellular layer of the pigmented polyethylene thereon is fed through a radiant heat furnace 9 comprising a cylinder having mounted along its inner walls a series of spaced electrical resistance heating elements 10 which are maintained at a temperature well above the melting temperature of the polyethylene. The wire 6 with the extruded layer thereon is passed through the furnace 9 at a rate such that its time of retention therein is long enough for the darkly pigmented polyethylene to absorb sufficient heat at its surface to at least partially fuse the surface layer. This fused layer, upon cooling, forms a smooth, glossy-surfaced skin, integral with the underlying cellular polyethylene, which is of very considerably greater thickness than the walls of polyethylene that separate the pores of the cellular structure, and which is substantially non-porous and has substantially the full density of the solid pigmented polyethylene.

Upon emergence of the wire from the furnace 9, it is cooled to room temperature by being passed through a cold water bath maintained in a long trough 11. The trough 11 is provided with a slot on each end to permit the wire 6 to pass therethrough beneath the water level. Overflow compartments 12, a small pump 13, and water lines 14 provide for recirculation of the water which escapes through the slots in the trough. A capstan 15 adjacent the wire exit end of the cooling bath is provided to draw the wire through the bath. After passing one or more times about this capstan, the wire is wound onto a reel or formed into a coil on conventional wire handling apparatus (not shown).

It is sometimes advantageous to pass the coated wire, after its emergence from the extrusion apparatus and after it has been expanded to cellular form, into a cold water bath, or otherwise to cool the coated wire substantially to room temperature, before introducing the same into the radiant heat furnace 9. If such is done, it is of course desirable to pass the wire through a second cold water bath or otherwise to cool it following its treatment in the radiant heat furnace. However, the embodiment of the invention illustrated in Fig. 1 has the advantage that it enables the operation to be carried out as a continuous process.

The mixture of polyethylene, blowing agent and pigment which is fed into the extrusion apparatus may be prepared in any conventional mixing apparatus. A convenient manner of preparing it is to tumble granular or flake polyethylene with granular or powdered blowing agent and a finely powdered formulation of pigments in a mixing barrel. Any blowing agent of the character used for making cellular rubber or plastic articles may be used in preparing the mixture. However, especially satisfactory results are obtained using nitrogen blowing agents. One such agent which has given very satisfactory results is $p,p'$ oxy bis (benzene sulfonyl hydrazide) which is sold under the trade name "Celogen" by the Naugatuck Chemical Division of the United States Rubber Company. Other nitrogen blowing agents which can be used with advantage are diazoaminobenzene and dinitroso pentamethylenetetramine. Nitrogen blowing agents such as those just mentioned are preferred because they are especially satisfactory for forming a cellular polyethylene structure in which the individual pores are all isolated from each other by substantially impervious walls of polyethylene, as distinguished from a spongy structure in which the individual pores are in substantially free communication with one another and with the outer surface of the structure. So far as the method of this invention is concerned, however, other blowing agents can be used with success. For example, ammonia blowing agents such as urea or biuret, or carbon dioxide blowing agents such as ammonium carbonate, and mixtures of these various types of blowing agents, all can be used.

The amount of blowing agent employed in preparing the mixture is determined by the extent to which it is desired to expand the polyethylene. In the manufacture of wires and cables for high frequency use, expansion to a bulk density at least 40%, and up to 75%, less than that of solid polyethylene generally is desired. For this degree of expansion only a relatively small amount of blowing agent is required, say ¼% to generally not more than about 1% by weight of the polyethylene mixture. Only in rare instances will the amount of blowing agent equal or exceed 2% by weight of the mixture.

The addition of a dark-colored pigment to the polyethylene mixture is important not only to impart improved weathering characteristics to the finished product by reducing the transmission of visible and ultra-violet radiation therethrough, but also it is of importance to the manner in which the new cable is made. When the wire with the extruded layer of polyethylene mixture thereon is exposed to a source of radiant heat, the dark-colored pigment near the surface of the insulation layer absorbs the infra-red radiation energy much more effectively than would the natural light-colored transparent or translucent polyethylene, and limits the penetration of such radiation into the interior of the body of insulation. Thus the heating step is accomplished more expeditiously, and fusion of the polyethylene is limited readily to the surface portion of the insulation, so that the formation of a relatively thick skin having a glossy smooth fused surface is easily achieved.

Any dark-colored pigment can be used in preparing the polyethylene mixture. However, electrically conducting or magnetic pigments should be used only in amounts that are small enough so as not to bring about any significant degradation of the dielectric properties of the polyethylene. Thus, while non-conducting and non-ferromagnetic pigments can be used in amounts up to 3% or even 5% by weight of the polyethylene mixture, electrically conducting non-metallic pigments such as carbon black and ferromagnetic pigments such as magnetite should not be used in amounts exceeding about 2% by weight of the mixture, and metallic pigments preferably are excluded altogether. The lower limit on the amount of pigment depends of course on its pigmenting power. Strong dark-colored pigments such as carbon black are effective in amounts as low as 0.1% by weight, and in general any of the common dark pigments give satisfactory results in amounts of 0.25% or more by weight of the mixture. Generally I prefer to use one or more pigments which impart a rich dark brown color to the polyethylene because such color very effectively darkens the polyethylene, yet is pleasing to the eye and yields a product which most persons find esthetically attractive. Following is a list, which is by no means exhaustive, of examples of pigments which are readily commercially available and can be used in making the polyethylene mixture:

Burnt umber
Carbon black
Red oxide of iron
Titanium dioxide
Lead chromate
Yellow ochre The above pigments may be used separately, or they may be blended to secure the preferred shade of brown or other desired color. Other pigments, however, may also be used, either as substitutes for or in combination with those listed above.

An example of a polyethylene composition prepared on the basis of the foregoing is one consisting essentially of 0.1% by weight of carbon black, 0.5% by weight of red oxide of iron, 0.75% "Celogen," and the balance polyethylene.

The procedure of heating the darkly pigmented polyethylene mixture by radiation, as distinguished from other methods of heating, is singularly effective for producing the above-described insulation structure comprising a cellular main body of insulation having integrally joined thereto a dense, non-porous, relatively thick, glossy-surfaced skin. Other heating methods, such as direct immersion of the polyethylene mixture in a heated oil bath (as described in my above-mentioned copending application Serial No. 323,252) do not produce skins which are either so relatively thick, or so free from pores and blisters, or so glossy-surfaced, as are obtained by the method herein described. Moreover, it is apparent from the foregoing that the incorporation of the pigment in the composition, in addition to improving the weather-resisting properties of the polyethylene, also cooperates with the radiant-heat method of forming the fused skin layer; for the dark-colored pigmentation of the polyethylene insures rapid and efficient absorption of radiant heat by the insulation in the furnace, and makes possible the rapid heating (by absorbed radiant heat) of the surface layer of the insulation to form the fused skin while the main mass thereof is being heated very slowly (by conduction from the skin layer) and does not reach the melting point of polyethylene.

I claim:

1. The method of forming a high frequency cable which comprises extruding a mixture of polyethylene, a dark-colored pigment and a blowing agent as an insulating layer about a wire, heating substantially the entire mass of said layer to above the decomposition temperature of the blowing agent but below the fusion temperature of the polyethylene, whereby a porous, cellular structure is imparted thereto, exposing the resulting cellular insulation layer on the wire to a source of radiant heat from electrical resistance heating elements maintained at a temperature substantially above the melting temperature of the polyethylene, and holding the wire thus exposed until polyethylene within the surface portion of said layer fuses to a dense, non-porous glossy smooth protective outer skin on said cellular insulation layer.

2. The method of forming a high frequency cable which comprises continuously extruding a heated mixture of polyethylene, a dark-colored pigment and a blowing agent in the form of an insulating layer about a continuously advancing wire, substantially the entire mass of said layer on the wire being heated to above the decomposition temperature of the blowing agent but below the fusing temperature of the polyethylene, whereby a porous cellular structure is imparted thereto, and continuously passing said wire with its resulting cellular insulation layer thereon through an exposed relation with a source of radiant heat from electrical resistance heating elements maintained at a temperature substantially above the melting temperature of the polyethylene, the rate of passage of the wire therethrough being such that the wire remains exposed to said radiant heat source until polyethylene within the outer surface portion of said layer fuses to a dense, non-porous glossy smooth protective outer skin on said cellular insulation layer.

3. The method of forming a high frequency cable which comprises the steps of heating a mixture of darkly pigmented polyethylene and a blowing agent and extruding an insulation layer of said mixture about a pair of wires arranged parallel to each other in spaced relation, the spacing between said wires being substantially less than the final desired spacing, substantially the entire mass of said layer after extrusion thereof being heated to above the decomposition temperature of the blowing agent but below the fusion temperature of the polyethylene, whereby said layer is expanded into a porous cellular structure and coincidentally the separation between the pair of wires is increased to the final desired spacing, then exposing the entire outer surface of the extruded insulation layer on the wire directly to a socure of radiant heat from electrical resistance heating elements maintained at a temperature substantially above the melting temperature of the polyethylene, and holding the extruded layer thus exposed until polyethylene within the surface portion of the polyethylene layer fuses to a dense non-porous glossy smooth protective surface skin of substantial thickness on said cellular insulation layer.

References Cited in the file of this patent

UNITED STATES PATENTS

| | | |
|---|---|---|
| 2,317,409 | Seaton | Apr. 27, 1943 |
| 2,371,868 | Berg et al. | May 20, 1945 |
| 2,406,039 | Roedel | Aug. 20, 1946 |
| 2,467,550 | Fletcher | Apr. 19, 1949 |
| 2,512,459 | Hamilton | June 20, 1950 |
| 2,518,454 | Elliott | Aug. 15, 1950 |
| 2,531,169 | Sprung | Nov. 21, 1950 |
| 2,737,503 | Sprague et al. | Mar. 6, 1956 |
| 2,782,251 | Ebel et al. | Feb. 19, 1957 |

FOREIGN PATENTS

| | | |
|---|---|---|
| 582,270 | Great Britain | Nov. 11, 1946 |
| 626,151 | Great Britain | July 11, 1949 |